(12) United States Patent
McKibben et al.

(10) Patent No.: US 10,533,337 B2
(45) Date of Patent: Jan. 14, 2020

(54) SYSTEMS AND APPARATUSES FOR CARPORT WITH INTEGRATED PRECIPITATION AND CABLE MANAGEMENT

(71) Applicant: SUNPOWER CORPORATION, San Jose, CA (US)

(72) Inventors: Nicholas J. McKibben, Oakland, CA (US); John Kapla, Mill Valley, CA (US); Sushrut G. Bapat, Alameda, CA (US); Elizabeth Schulte, Oakland, CA (US); Gary A. Rossi, Pleasant Hill, CA (US); Jeremy Mansell, Berkeley, CA (US); Andrew R. Wolf, Burlingame, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 16/529,375

(22) Filed: Aug. 1, 2019

(65) Prior Publication Data
US 2019/0383051 A1    Dec. 19, 2019

Related U.S. Application Data

(63) Continuation of application No. 15/936,021, filed on Mar. 26, 2018, now Pat. No. 10,428,547, which is a
(Continued)

(51) Int. Cl.
*E04H 6/42* (2006.01)
*H02S 20/20* (2014.01)
(Continued)

(52) U.S. Cl.
CPC ............ *E04H 6/42* (2013.01); *E04H 6/08* (2013.01); *E04H 15/34* (2013.01); *H02S 20/10* (2014.12); *H02S 20/20* (2014.12); *H02S 20/23* (2014.12)

(58) Field of Classification Search
CPC .. E04H 6/08; E04H 6/025; E04H 6/42; E04H 15/008; E04H 15/34; H02S 20/10; H02S 20/20
See application file for complete search history.

(56) References Cited

U.S. PATENT DOCUMENTS

| 6,930,237 B2 | 8/2005 | Mattiuzzo |
| 9,202,396 B2 | 12/2015 | Mackler |

(Continued)

FOREIGN PATENT DOCUMENTS

| DE | 102009017337 A1 | 10/2010 |
| DE | 102016117648 A1 | 9/2017 |

(Continued)

*Primary Examiner* — Christine T Cajilig
(74) *Attorney, Agent, or Firm* — Oblon, McClelland, Maier & Neustadt, L.L.P.

(57) ABSTRACT

A solar power generation assembly includes a vertical support column; a canopy including a plurality of solar modules for solar power generation; a first brace and a second brace on a first side of the support column to support the canopy; a third brace and a fourth brace on a second side of the support column to support the canopy; and a gutter system integrated into the canopy and directing precipitation along one or more of the second brace and the fourth brace to the support column. One or more of the first brace and the third brace manage electrical cables extending from the canopy to the support column.

20 Claims, 17 Drawing Sheets

Related U.S. Application Data continuation of application No. 29/639,281, filed on Feb. 26, 2018, now Pat. No. Des. 850,363.

(60) Provisional application No. 62/593,475, filed on Dec. 1, 2017, provisional application No. 62/608,329, filed on Dec. 20, 2017.

(51) Int. Cl.
| | | |
|---|---|---|
| *E04H 6/08* | (2006.01) | |
| *H02S 20/23* | (2014.01) | |
| *H02S 20/10* | (2014.01) | |
| *E04H 15/34* | (2006.01) | |

(56) References Cited

U.S. PATENT DOCUMENTS

| | | |
|---|---|---|
| 2010/0132769 A1 | 6/2010 | Potter |
| 2011/0030285 A1 | 2/2011 | Kaufman |
| 2011/0146661 A1* | 6/2011 | Dudas .................... H02S 20/30 126/575 |
| 2016/0138832 A1 | 5/2016 | Thramann |

FOREIGN PATENT DOCUMENTS

| | | | |
|---|---|---|---|
| FR | 2944042 B1 | 5/2015 | |
| WO | 2010/123929 Z1 | 10/2010 | |

\* cited by examiner

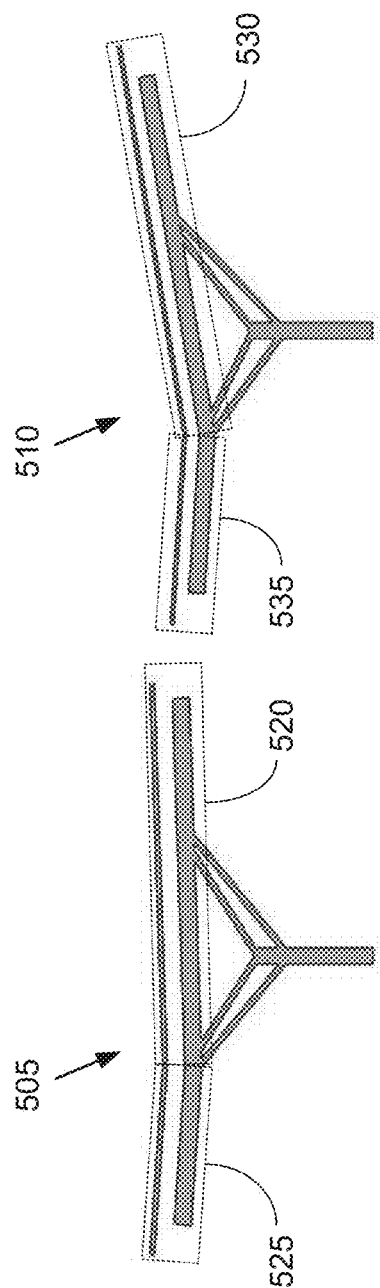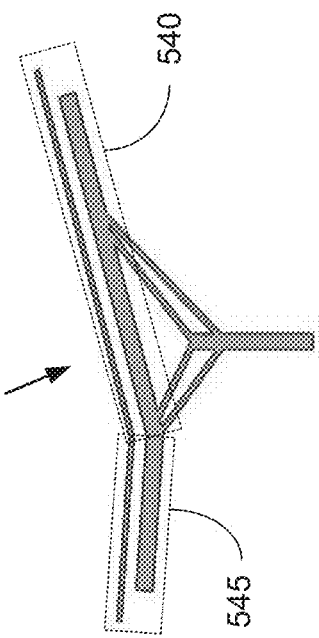
Fig. 5A
Fig. 5B
Fig. 5C

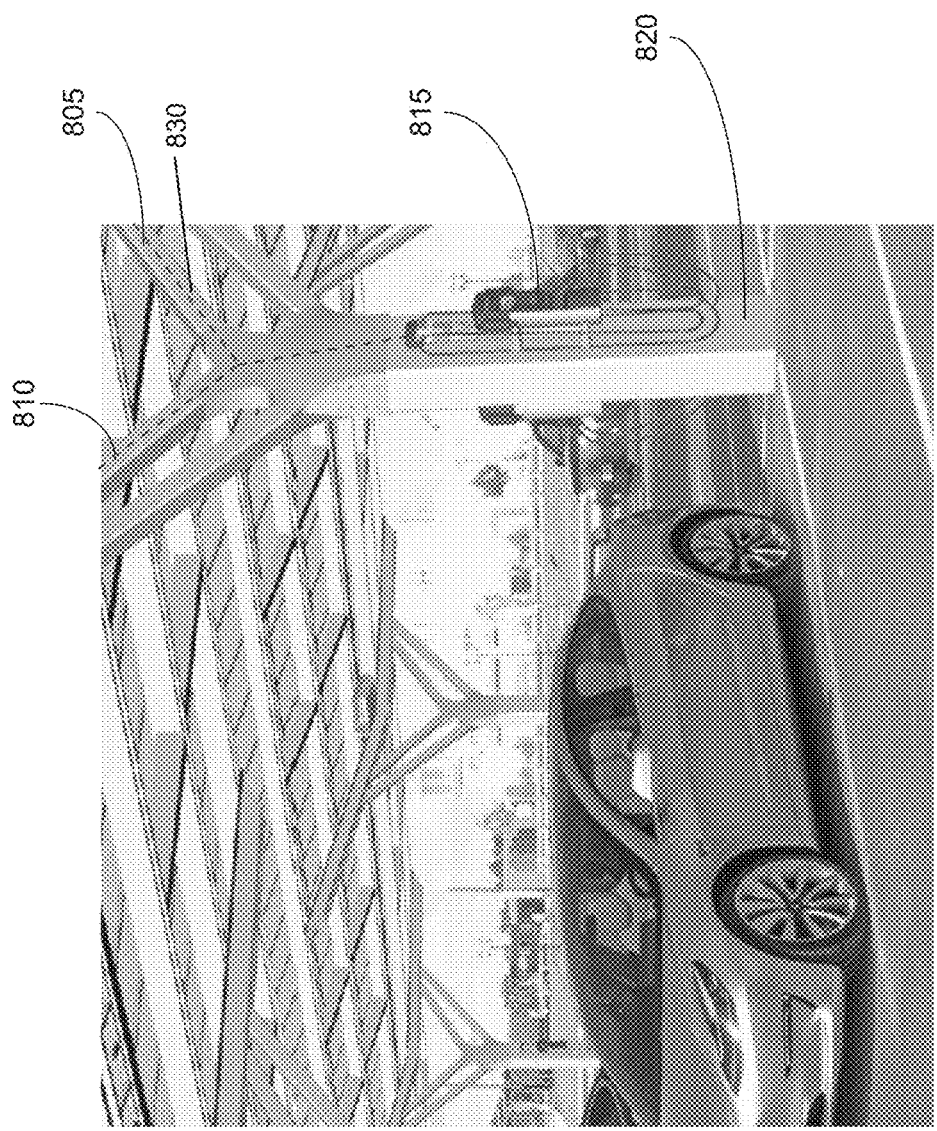

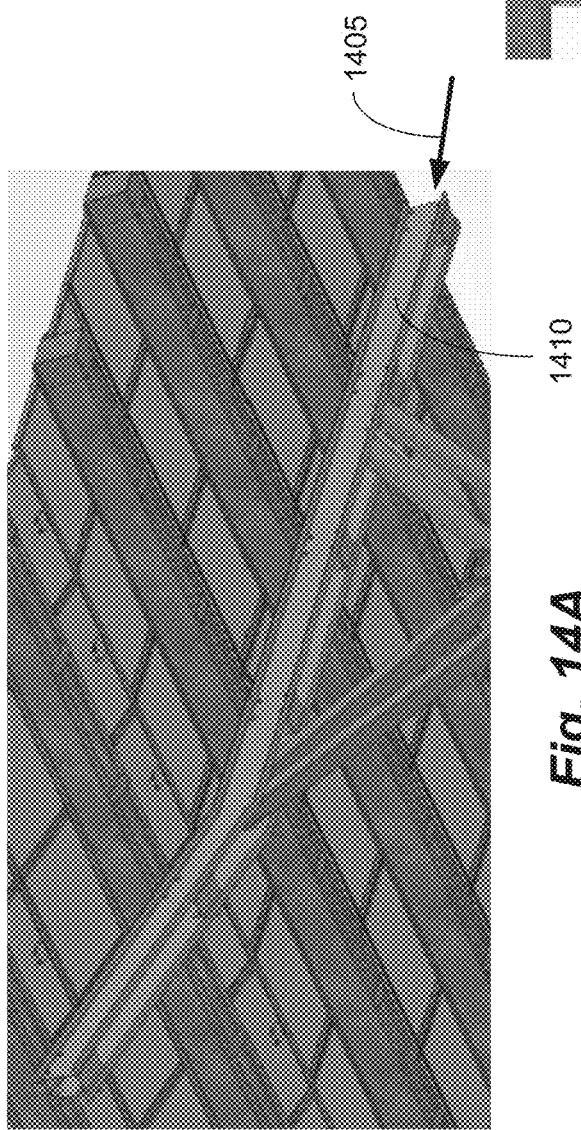
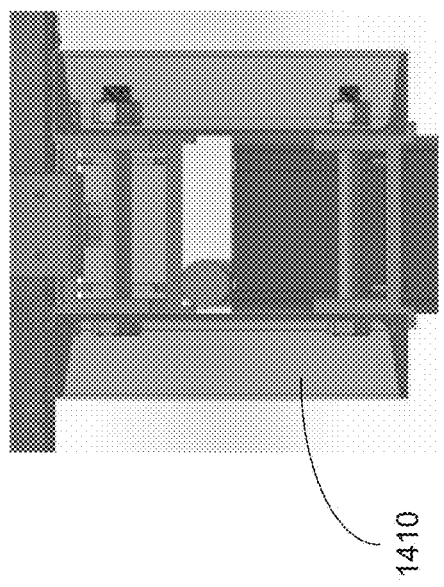
Fig. 14A
Fig. 14B

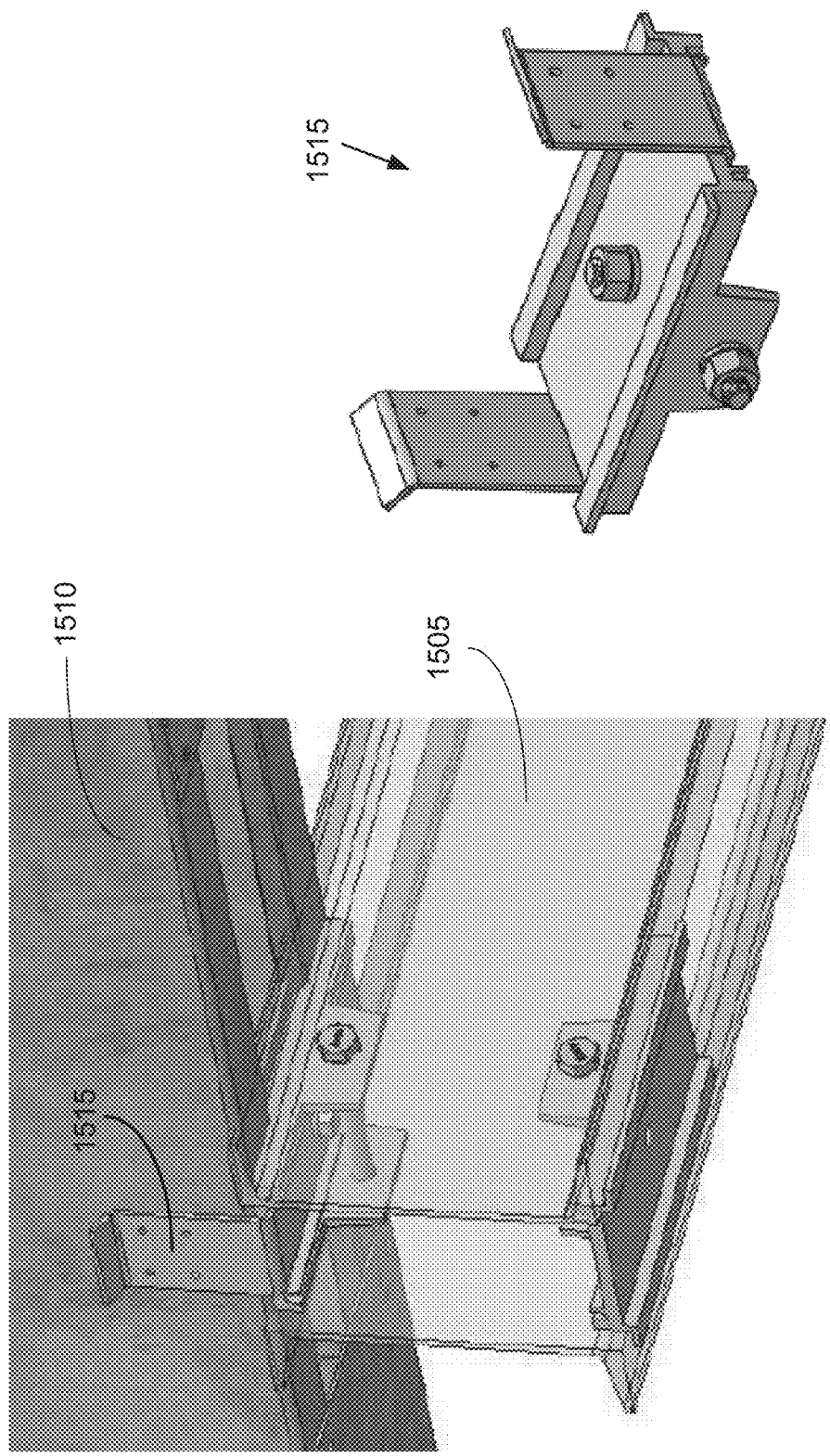

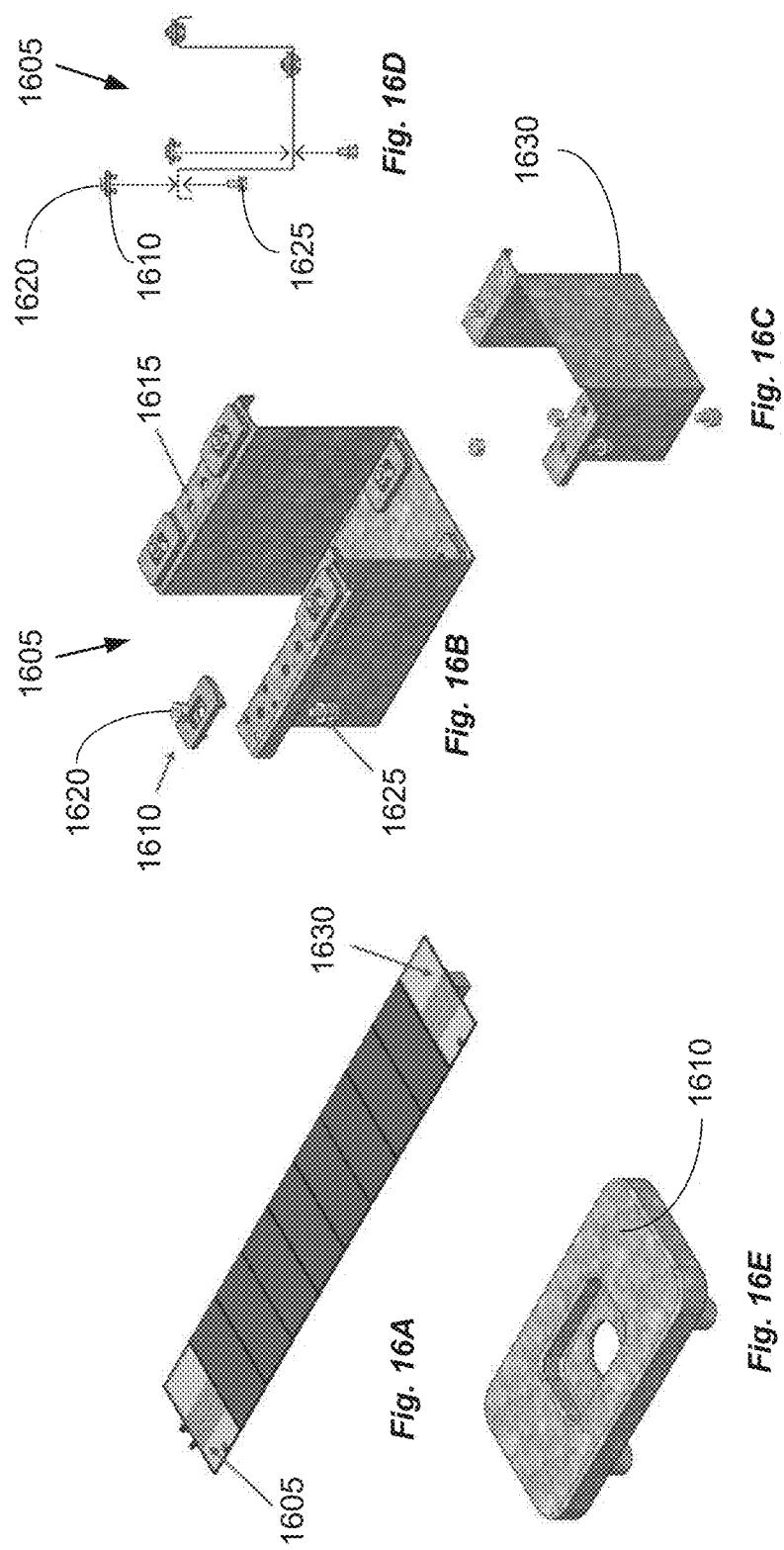

SYSTEMS AND APPARATUSES FOR CARPORT WITH INTEGRATED PRECIPITATION AND CABLE MANAGEMENT

CROSS-REFERENCE TO RELATED APPLICATION

This application is a continuation of U.S. application Ser. No. 15/936,021, filed Mar. 26, 2019, which claims the benefit of U.S. Design application No. 29/639,281 (now U.S. Pat. No. D850,363), which claims the benefit of U.S. Provisional Application No. 62/593,475, filed Dec. 1, 2017 and U.S. Provisional Application No. 62/608,329 filed Dec. 20, 2017, which are all incorporated herein by reference in their entirety.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

To reduce dependence on fossil fuels (both domestic and imported) and reduce the negative environmental impacts of such fuel emissions, there is a need to increase the distributed power generation base. Similarly, there is a need to maximize the value and productivity of single-use real estate to facilitate such things as mounting for PV or solar modules, shade for cars, shade for outdoor activities and other events and purposes. Complications and limitations associated with rooftop installations make incorporating solar power generation systems in underutilized open spaces one such means of addressing these needs. This will necessitate an increase of the electrical transmission infrastructure.

Conventional support structures for PV power systems are typically designed such that the module arrays are oriented along a single slope plane. Several drawbacks of these structures include limited sight lines from beneath the structures, avalanching of snow and ice from the system, and difficulty of deployment on parking lots that are not ideally geographically oriented. Accordingly, there is a need for an improved solar power generation assembly and methods for providing same.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to embodiments of the disclosed subject matter, a carport includes a casting, wherein a first brace and a second brace on a first side of the casting support a canopy, and a third brace and a fourth brace on a second side of the casting also support the canopy. One or more of the first brace and the third brace are configured for electrical cable management, wherein electrical cables disposed within the first brace extend from the canopy through the first side of the casting, and electrical cables disposed within the third brace extend from the canopy through the second side of the casting. Additionally, one or more of the second brace and the fourth brace are configured for precipitation management, wherein a gutter system integrated into the canopy directs precipitation to the second brace and the fourth brace, and the second brace and the fourth brace direct the precipitation from the canopy toward the casting.

According to embodiments of the disclosed subject matter, a support structure includes a casting, wherein support structure includes a first brace and a second brace on a first side of the casting and a third brace and a fourth brace on a second side of the casting, wherein one or more of the first brace and the third brace are configured for electrical cable management, wherein electrical cables are disposed within the first brace extend through the first side of the casting, and electrical cables disposed within the third brace extend through the second side of the casting. Additionally, one or more of the second brace and the fourth brace are configured for precipitation management, wherein precipitation flows through the second brace and the fourth brace to direct precipitation toward the casting.

According to embodiments of the disclosed subject matter, a dual-tilt carport includes a casting. Additionally, the dual-tilt carport includes a first brace and a second brace on a first side of the casting supporting a first portion of a canopy, wherein the first portion of the canopy is tilted at a first predetermined tilt angle. Further, the dual-tilt carport includes a third brace and a fourth brace on a second side of the casting supporting a second portion of the canopy, wherein the second portion of the canopy is tilted at a first predetermined tilt angle, wherein the first portion of the canopy is longer than the second portion of the canopy. Additionally, one or more of the first brace and the third brace are configured for electrical cable management, wherein electrical cables disposed within the first brace extend from one or more of the first portion of the canopy and the second portion of the canopy through the first side of the casting, and electrical cables disposed within the third brace extend from one or more of the first portion of the canopy and the second portion of the canopy through the second side of the casting. Additionally, one or more of the second brace and the fourth brace are configured for precipitation management, wherein a gutter system integrated into the first and second portion of the canopy directs precipitation to the second brace and the fourth brace, and the second brace and the fourth brace direct the precipitation from the first and second portion of the canopy toward the casting.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A depicts an exemplary dual-tilt carport in a first predetermined tilt angle configuration according to one or more aspects of the disclosed subject matter:

FIG. 5B depicts an exemplary dual-tilt carport in a second predetermined tilt angle configuration according to one or more aspects of the disclosed subject matter;

FIG. 5C depicts an exemplary dual-tilt carport in a third predetermined tilt angle configuration according to one or more aspects of the disclosed subject matter;

FIG. 8 depicts an exemplary integrated charging station according to one or more aspects of the disclosed subject matter:

FIG. 14A depicts a perspective view of an exemplary crossbeam according to one or more aspects of the disclosed subject matter:

FIG. 14B depicts a lengthwise end view of an exemplary crossbeam according to one or more aspects of the disclosed subject matter;

FIG. 15A depicts an exemplary connection of a crossbeam connected to a purlin according to one or more aspects of the disclosed subject matter;

FIG. 15B depicts an exemplary connection apparatus configured to attach a crossbeam to a purlin according to one or more aspects of the disclosed subject matter;

FIG. 16A depicts an exemplary row of photovoltaic modules according to one or more aspects of the disclosed subject matter;

FIG. 16B depicts an exemplary purlin coupler according to one or more aspects of the disclosed subject matter;

FIG. 16C depicts an exemplary purlin end cap according to one or more aspects of the disclosed subject matter;

FIG. 16D depicts an end view of an exemplary purlin coupler according to one or more aspects of the disclosed subject matter; and FIG. 16E depicts an exemplary washer block according to one or more aspects of the disclosed subject matter.

DETAILED DESCRIPTION

Figure 1:
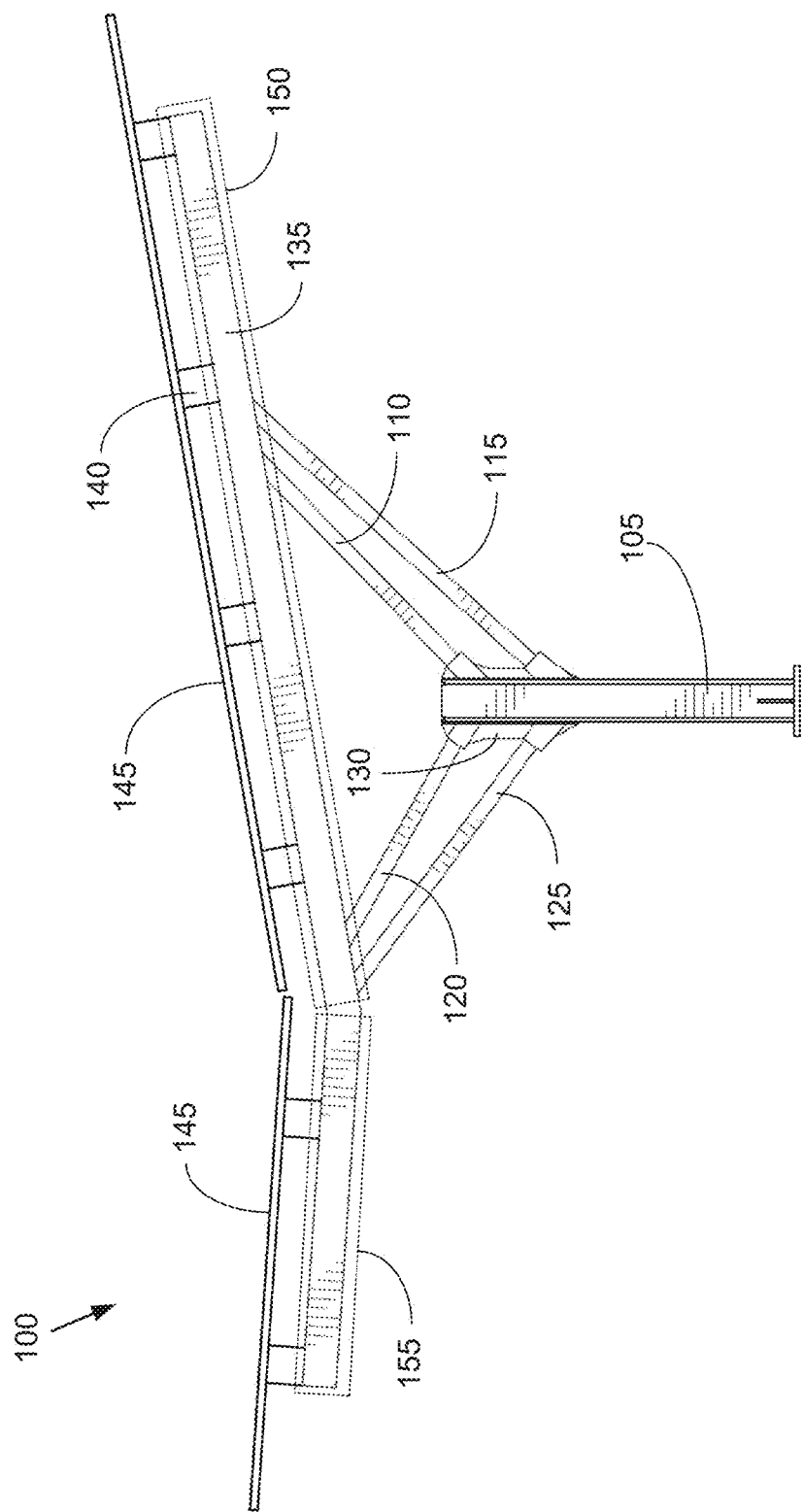
FIG. 1 depicts an exemplary solar power generation assembly according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

Figure 2:
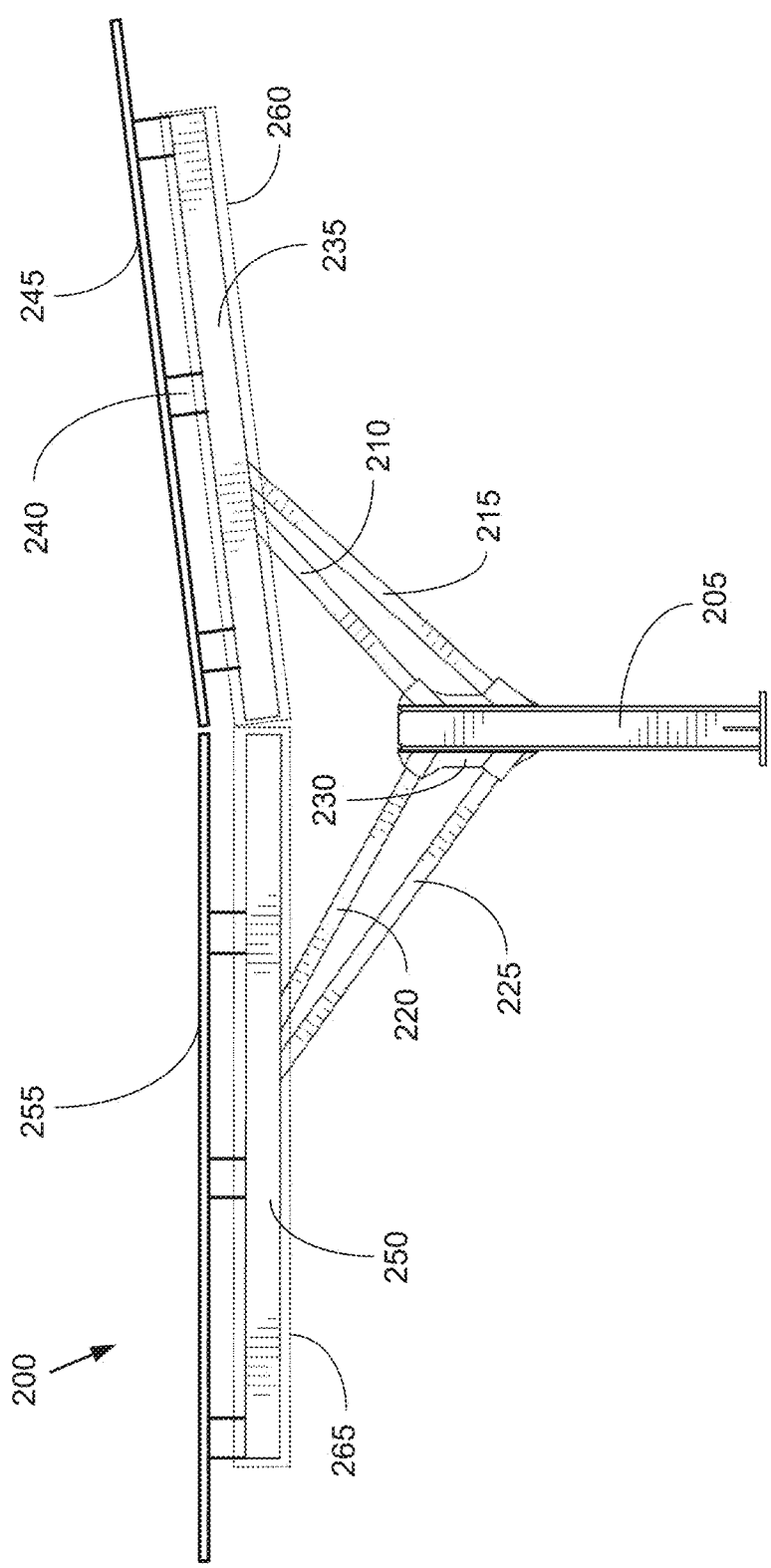
FIG. 2 depicts an exemplary solar power generation assembly according to one or more aspects of the disclosed subject matter.
Figure 3:
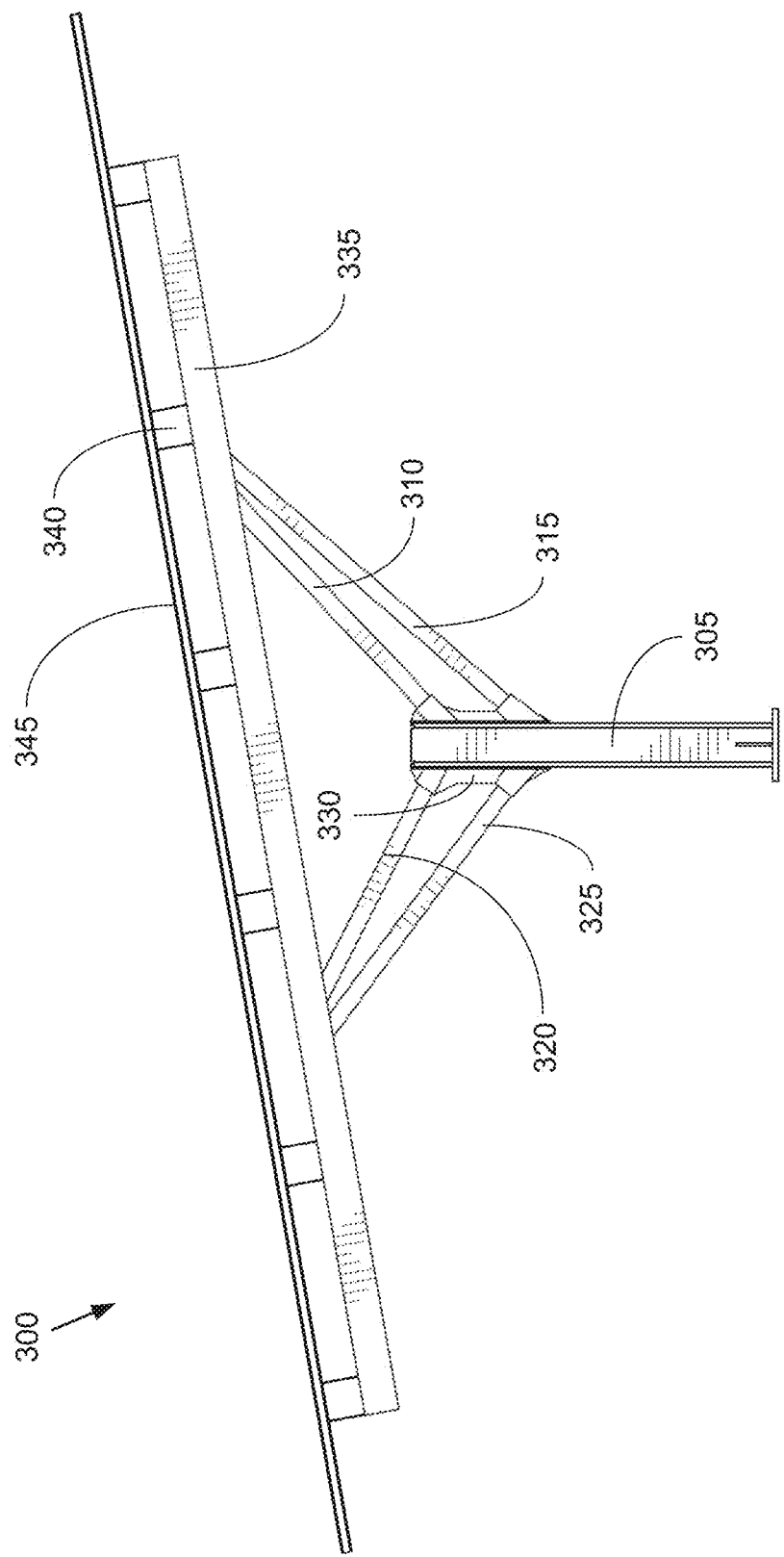
FIG. 3 depicts an exemplary solar power generation assembly according to one or more aspects of the disclosed subject matter.

FIGS. 1-3 depict exemplary solar power generation assemblies 100, 200, 300 including a casting support structure supporting one or more canopies including a plurality of solar or photovoltaic modules configured for solar power generation. In general, the casting support structure elegantly and seamlessly integrates precipitation management, electrical cable management, lighting, and electric vehicle charging features with the solar power generation assembly.

More specifically, FIG. 1 depicts an exemplary solar power generation assembly 100 according to one or more aspects of the disclosed subject matter. In one implementation, the solar power generation assembly 100 is a dual-tilt carport. However, the solar power generation assembly 100 can be a service station, a canopy for shade or otherwise, a garage or any other functional and/or aesthetic structure, for example.

In one implementation, the dual-tilt carport has an asymmetric canopy, wherein a first portion 150 of the canopy is longer than a second portion 155 of the canopy. Additionally, the first portion 150 of the canopy can be tilted at a first predetermined tilt angle and the second portion 155 of the canopy can be titled at a second predetermined tilt angle. Generally, the one or more predetermined tilt angles of the solar power generation assemblies 100, 200, 300 are based on geographical location, which includes considering what predetermined tilt angles are optimal for solar power generation in that geographical location. Alternatively, or additionally, the predetermined tilt angles are based on the orientation of the solar power generation assembly, which includes considering how many degrees off azimuth the solar power generation assembly is oriented.

The casting 130 is attached to the column 105. In one implementation, the casting may be in the form of a Y-casting. However, other shapes and/or form factors for casting are possible. A first brace 110, a second brace 115, a third brace 120, and a fourth brace 125 connect the casting 130 to the crossbeam 135. As a result, the column 105, casting 130, and first brace 110, second brace 115, third brace 120, and fourth brace 125 provide a support structure. In one implementation, the support structure is a "Y" support structure, but other shapes and/or form factors are possible. Further, the crossbeam 135 supports a plurality of purlins 140, and the purlins 140 support a plurality of solar or photovoltaic modules 145. In one implementation, each purlin supports a row of photovoltaic modules 145. The first, second, third, and fourth brace 110, 115, 120, 125 can be manufactured at different lengths based on the predetermined tilt angle.

Additionally, in one implementation, the solar power generation assembly 100 includes a plurality of columns 105. The distance between each column 105 can be based on geographic location and corresponding expected weather in that geographic location. For example, because snow can be reasonably expected each winter in the northeastern portion of the United States, for example, the columns 105 can be placed closer together to more robustly support the weight of any snowfall. On the other hand, because snow is less likely in the western portion of the United States (e.g., California), the columns 105 can be placed farther apart. Table 1 includes an exemplary number of columns 105 and column spacing for expected snowfall in certain geographical regions.

FIG. 2 depicts an exemplary solar power generation assembly 200 according to one or more aspects of the disclosed subject matter. In one implementation, the solar power generation assembly 200 is a dual-tilt carport, wherein the dual-tilt carport has a symmetric canopy where a first portion of the canopy (e.g., first canopy 260) is the same length as a second portion of the canopy (e.g., second canopy 265). Solar power generation assembly 200 includes components that can also be used in solar power generation assembly 100. For example, the solar power generation assembly includes casting 230, column 205, first brace 210, second brace 215, third brace 220, fourth brace 225, and purlins 240. However, the solar power generation assembly 200 includes a first canopy 260 and a second canopy 265. The first canopy 260 includes a first crossbeam 235 and a first set of photovoltaic modules 245 belonging to the first canopy 260. The second canopy 265 includes a second crossbeam 250 and a second set of photovoltaic modules 255 belonging to the second canopy 265. The first crossbeam 235 and the second crossbeam 250 do not directly connect. Additionally, the first set of photovoltaic modules 245 and the second set of photovoltaic modules 255 do not directly connect. As a result, the first brace 210 and the second brace 215 support the first canopy 260, and the first brace 210 and the second brace 215 are each manufactured to a predetermined length based on the predetermined tilt angle of the first canopy 260. Additionally, the third brace 220 and the fourth brace 225 support the second canopy 265, and the third brace 220 and the fourth brace 240 are each manufactured to a predetermined length based on the predetermined tilt angle of the second canopy 265.

FIG. 3 depicts an exemplary solar power generation assembly 300 according to one or more aspects of the disclosed subject matter. The solar power generation assembly 300 also shares similar components as the solar power generation assemblies 100, 200 (e.g., casting and column). In one implementation, the solar power generation assembly 300 is a single-tilt carport. The solar power generation assembly 300 includes a casting 330 attached to a column 305. A first brace 310, a second brace 315, a third brace 320, and a fourth brace 325 connect the casting 330 to a crossbeam 335. The crossbeam 335 supports a plurality of purlins 340, and the purlins 340 support a plurality of photovoltaic modules 345. For example, each purlin 340 supports a row of photovoltaic modules 345. The first brace 310, the second brace 315, the third brace 320, and the fourth brace 325 are manufactured at different lengths based on the predetermined tilt angle of the single-tilt carport.

It should be appreciated that the casting support configuration allows for common structural members for each of the solar power generation assemblies 100, 200, 300 including the columns 105, 205, 305; the braces 110, 115, 120, 125, 210, 215, 220, 225, 310, 315, 320, 325; and the crossbeams

| Series | Modules "Up" | Total Length (ft) | East Coast, 40 pounds per square foot (psf) of snow | | West Coast | | East Coast, 50 psf | |
|---|---|---|---|---|---|---|---|---|
| | | | # Column | Col Space (ft) | # Column | Col Space (ft) | # Column | Col Space (ft) |
| E-83 kW | 6 | 138.9 | 5 | 29.5 | 4 | 37.5 | 7 | 20.7 |
| E-66 kW | 6 | 104.2 | 4 | 28.1 | 3 | 38.5 | 5 | 22.1 |
| E-43 kW | 6 | 69.5 | 3 | 25.7 | 2 | 40.7 | 4 | 18.7 |
| X-83 kW | 6 | 125.0 | 5 | 26.6 | 4 | 33.7 | 7 | 18.6 |
| X-66 kW | 6 | 93.8 | 4 | 25.3 | 3 | 34.6 | 5 | 19.9 |
| X-43 kW | 6 | 62.5 | 3 | 23.1 | 2 | 36.6 | 4 | 16.9 |

135, 235, 335. However, the crossbeams may be manufactured for different predetermined tilt angles and the braces may be manufactured at different lengths to accommodate for the different predetermined tilt angles. For example, the first brace 110 and the second brace 115 in FIG. 1 will be longer when the first portion 150 of the canopy is at a 15 degree tilt angle compared to a 10 degree tilt angle. However, the first brace 110 and the second brace 115 in FIG. 1 for a 10 degree tilt angle can be the same lengths as the first brace 210 and the second brace 215 in FIG. 2 for a 10 degree tilt angle even though the braces are for different solar power generation assemblies, which provides a significant cost savings in manufacturing.

In one implementation, the tilt angle is measured relative to an axis that is perpendicular to a lengthwise axis of the column 105, 205, 305. In other words, if the column 105, 205, 305 is vertical, a horizontal axis perpendicular to the vertical column is the reference (i.e., 0 degree tilt angle) for measuring the tilt angle of the one or more canopies or one or more portions of canopies of the solar power generation assembly.

Although the canopy is described as a solar canopy, the disclosure is not limited to solar canopies and the inventive aspects described herein can be used with any canopy, awning or roof structure.

Figure 4B:
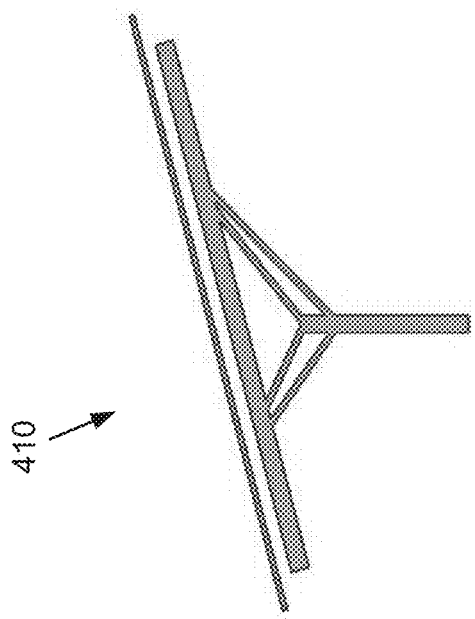
FIG. 4B depicts an exemplary single-tilt carport at a second predetermined tilt angle according to one or more aspects of the disclosed subject matter.
Figure 4A:
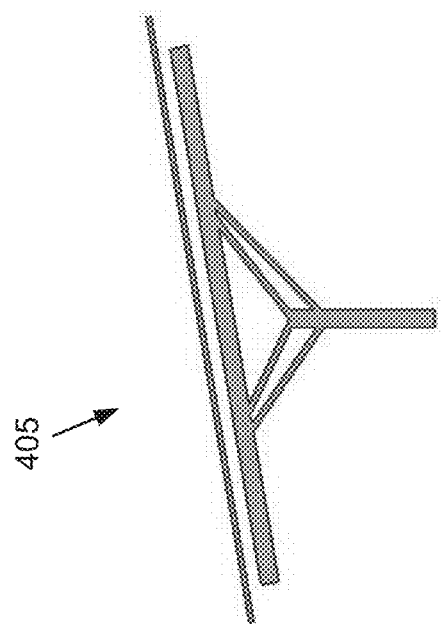
FIG. 4A depicts an exemplary single-tilt carport at a first predetermined tilt angle according to one or more aspects of the disclosed subject matter.

FIG. 4A depicts an exemplary single-tilt carport 405 at a predetermined tilt angle according to one or more aspects of the disclosed subject matter. In one implementation, the predetermined tilt angle of the single-tilt carport 405 is 10 degrees. However, the predetermined tilt angle of the single-tilt carport 405 can be 1 degree to 20 degrees. Thus, the exact tilt angle is not limiting on the present disclosure.

FIG. 4B depicts an exemplary single-tilt carport 410 at a predetermined tilt angle according to one or more aspects of the disclosed subject matter. In one implementation, the predetermined tilt angle of the single-tilt carport 410 is 15 degrees. However, the predetermined tilt angle of the single-tilt carport 410 can be 1 degree to 20 degrees. Thus, these tilt angles are merely exemplary, and other tilt angles are possible without departing from the present disclosure.

FIG. 5A depicts an exemplary dual-tilt carport 505 in a first predetermined tilt angle configuration according to one or more aspects of the disclosed subject matter. In one implementation, the first predetermined tilt angle configuration includes a first portion 520 of the canopy having a tilt angle of 2 degrees and a second portion 525 of the canopy having a tilt angle of 4 degrees.

FIG. 5B depicts an exemplary dual-tilt carport 510 in a second predetermined tilt angle configuration according to one or more aspects of the disclosed subject matter. In one implementation, the second predetermined tilt angle configuration includes a first portion 530 of the canopy having a tilt angle of 10 degrees and a second portion 535 of the canopy having a tilt angle of 4 degrees.

FIG. 5C depicts an exemplary dual-tilt carport 515 in a third predetermined tilt angle configuration according to one or more aspects of the disclosed subject matter. In one implementation, the third predetermined tilt angle configuration includes a first portion 540 of the canopy having a tilt angle of 15 degrees and a second portion 545 of the canopy having a tilt angle of 4 degrees.

Referring to FIGS. 4A, 4B, and 5A-5C, it should be appreciated that portions of the solar power generation assemblies can use the same components for multiple solar power generation assemblies. For example, the casting may be the same component for each of the solar power generation assemblies. More specifically, the first and second brace can be used for both solar power generation assembly 405 and solar power generation assembly 510 because the tilt angle of the solar power generation assembly 405 and the tilt angle of the first portion of the solar power generation assembly 510 are the same. As a result, manufacturing costs can be reduced significantly.

Figure 6:
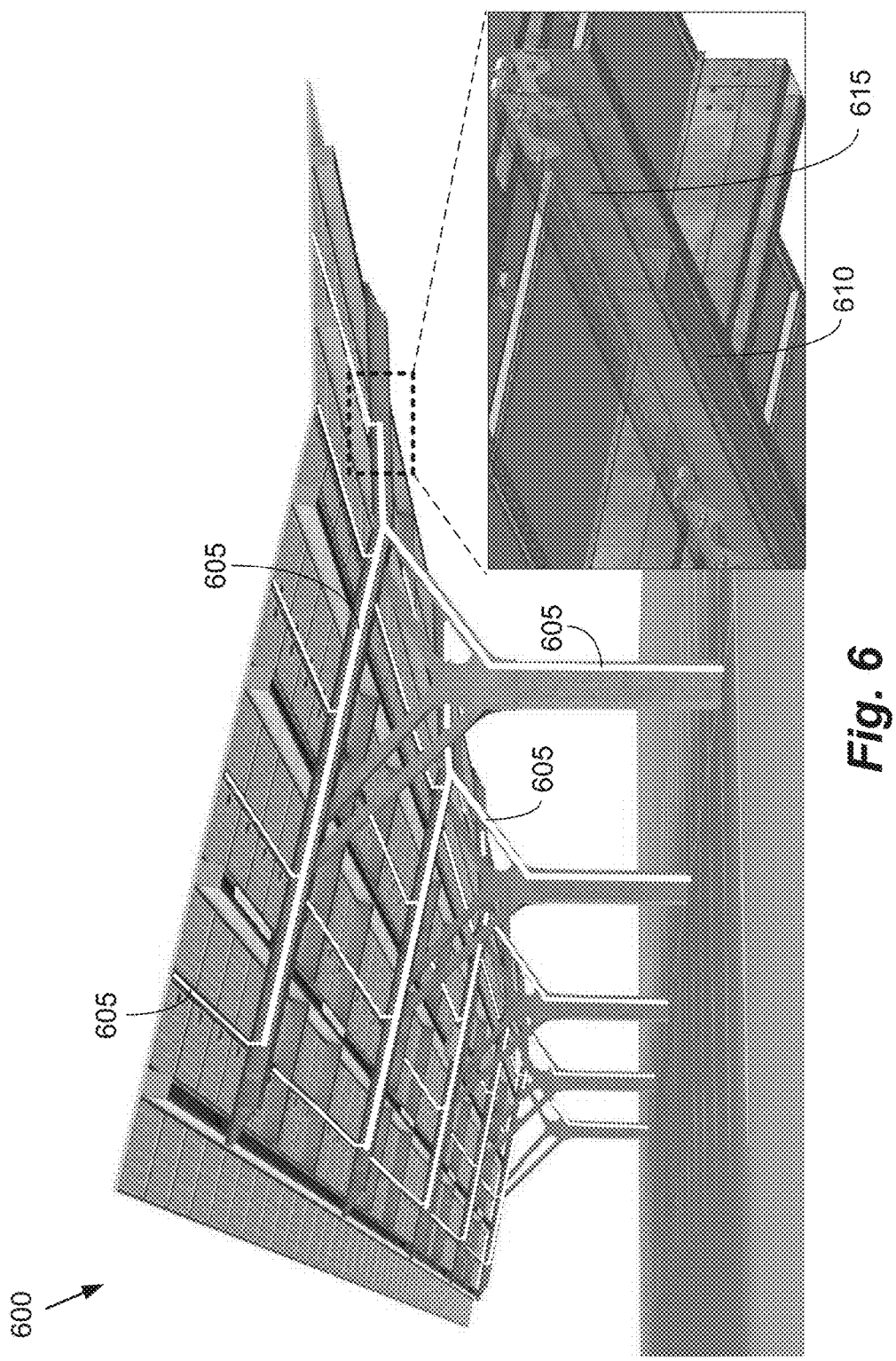
FIG. 6 depicts an exemplary precipitation flow according to one or more aspects of the disclosed subject matter.

FIG. 6 depicts an exemplary precipitation flow 605 for solar power generation assembly 600 according to one or more aspects of the disclosed subject matter. In one implementation, solar power generation assembly 600 can have an asymmetrical canopy like solar power generation assembly 100. However, it should be appreciated that the precipitation flow 605 has generally the same flow for each solar power generation assembly 100, 200, and 300 configuration in that the precipitation flow is eventually directed to one or more braces (e.g., the second brace and/or fourth brace) and through the casting (e.g., casting 130, 230, 330). More specifically, precipitation can initially collect in a gutter system between rows of photovoltaic modules which drain to each crossbeam. Each crossbeam directs precipitation toward a corresponding brace (e.g., the second brace 115, 215, 315 and/or the fourth brace 125, 225, 325). Then the one or more braces direct precipitation to the casting where a gutter can be disposed within or adjacent to the column where the precipitation flow 605 terminates.

In one implementation, the casting and corresponding braces are configured such that at least one of the precipitation management braces (e.g., second brace 115) is positioned to connect to the crossbeam of the canopy at a lowest point of the canopy to assist in removal of precipitation from the canopy.

Additionally, FIG. 6 depicts a zoomed in view of a gutter 610 disposed within a crossbeam 615, wherein the gutter 610 is configured to direct the precipitation flow 605 to the water management brace (e.g., the second brace 115, 215, 315 and/or the fourth brace 125, 225, 325).

Figure 7A:
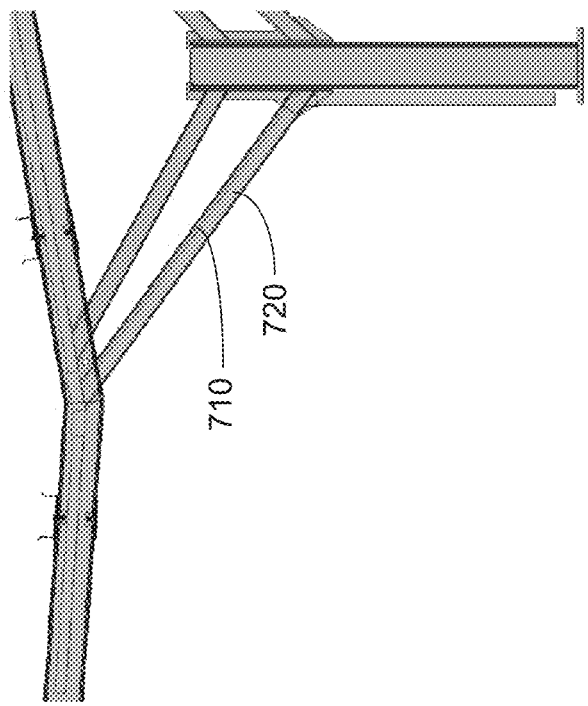
FIG. 7A depicts an exemplary external portion for precipitation management according to one or more aspects of the disclosed subject matter.

FIG. 7A depicts an exemplary external portion 705 for precipitation management according to one or more aspects of the disclosed subject matter. In one implementation, a brace 710 includes an external portion 705 of a precipitation management system for the power generation assembly, wherein the external portion 705 is a gutter attached to the brace 710. More specifically, the external portion is disposed outside of the brace 710.

Figure 7B:
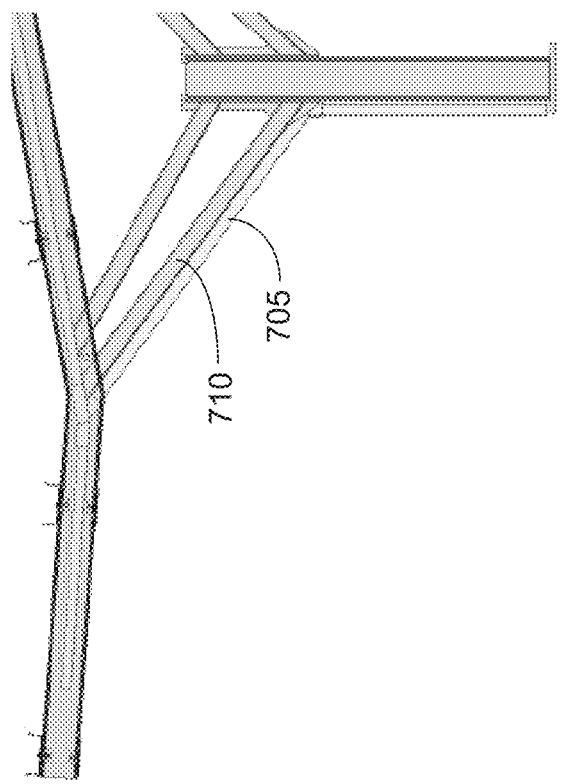
FIG. 7B depicts an exemplary internal portion for precipitation management according to one or more aspects of the disclosed subject matter.

FIG. 7B depicts an exemplary internal portion 720 for precipitation management according to one or more aspects of the disclosed subject matter. In one implementation, the internal portion 720 is disposed inside the brace 710.

Referring to FIGS. 7A and 7B, both the external portion 715 and the internal portion 720 are portions of the precipitation flow 605 in FIG. 6 configured to assist in removing precipitation from the one more canopies. Additionally, it should be appreciated that brace 710 can correspond to the fourth brace 125, 225, 325. Additionally, the second brace 115, 215, 315 can also be similarly configured to assist in removing precipitation from the one or more canopies.

FIG. 8 depicts an exemplary integrated charging station 815 according to one or more aspects of the disclosed subject matter. In one implementation, the charging station 815 is integrated into a column 820, wherein the column 820 is configured to support a portion of a solar power generation assembly. The column 820 can be part of a Y-structural support configuration that includes a casting (e.g., casting 130, 230, 330) and a plurality of braces configured to support electrical cable and precipitation management. In one implementation, one or more of braces 805 and 810 are configured for electrical cable management. For example, electrical cables can be disposed in one or more of the braces 805 and 810 such that the electrical cables can run from the photovoltaic modules in a canopy of the solar power generation assembly to the charging station 815. More specifically, the electrical cables can run from the photovoltaic modules, through one or more of the braces 805 and 810, through the casting, and through the column to the charging station 815. It should be appreciated that the charging station 815 can represent one or more charging stations integrated into the column 820. Additionally, brace 805 can correspond to the first brace 110, 210, 310, and the brace 810 can correspond to the third brace 120, 220, 320.

Figure 9:
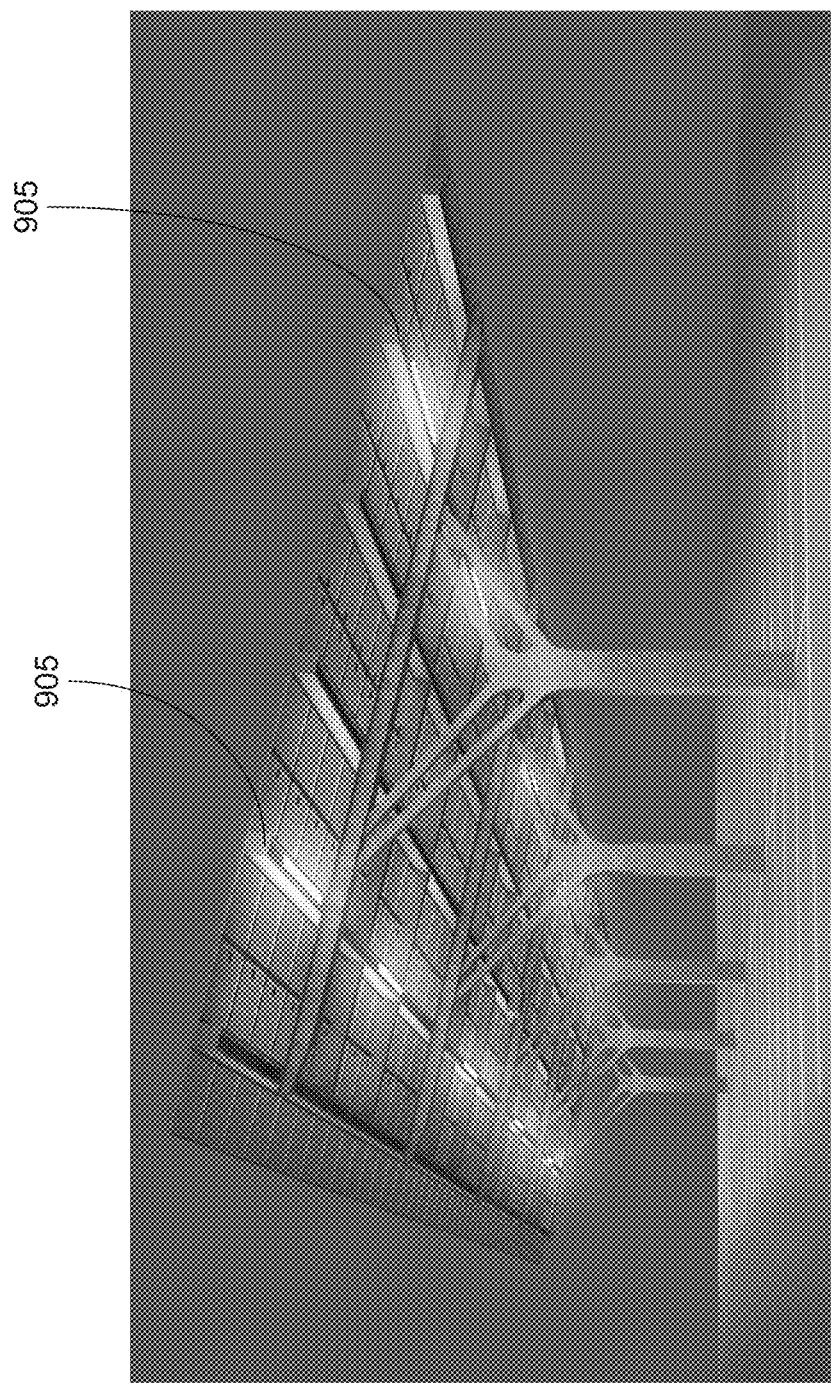
FIG. 9 depicts exemplary integrated lighting according to one or more aspects of the disclosed subject matter.

FIG. 9 depicts exemplary integrated lighting 905 according to one or more aspects of the disclosed subject matter. In one implementation, the lighting 905 is integrated into one or more purlins in a solar power generation assembly (e.g., solar power generation assembly 100, 200, 300). The lighting 905 can be LED lights recessed into one or more of the purlins. Additionally, the electricity required to operate the lighting 905 can be provided by the photovoltaic modules.

Figure 10:
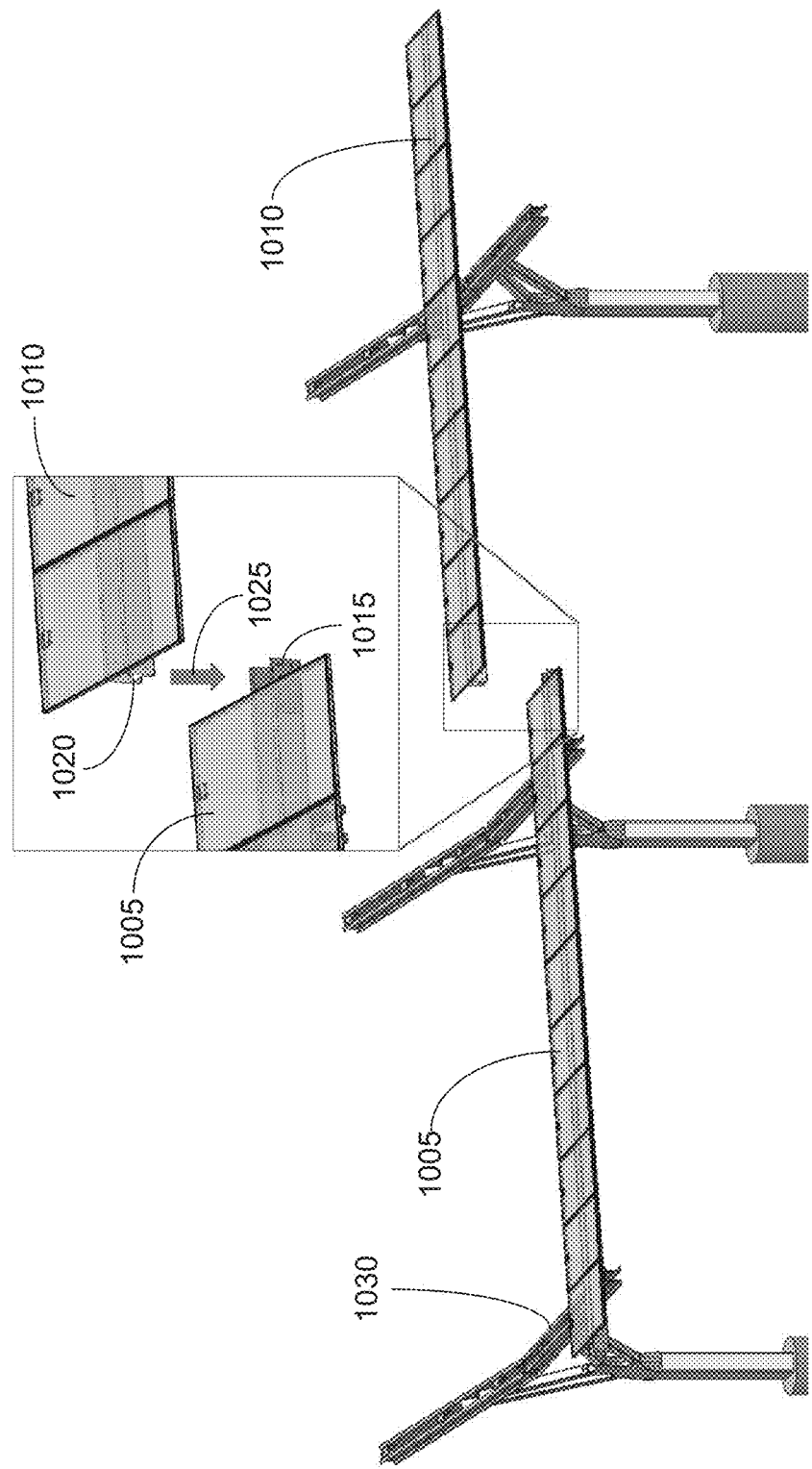
FIG. 10 depicts exemplary purlin connection according to one or more aspects of the disclosed subject matter.

FIG. 10 depicts exemplary purlin connection according to one or more aspects of the disclosed subject matter. In one implementation, assembling a solar power generation assembly includes installing rows of photovoltaic modules, wherein each row of photovoltaic modules is connected to one or more purlins. For example, a first row of photovoltaic modules 1005 can be connected to a first purlin 1015 and a second row of photovoltaic modules 1010 can be connected to a second purlin 1020. The second row of photovoltaic modules 1010 and corresponding second purlin 1020 can be connected to the first row of photovoltaic modules 1005 and corresponding first purlin 1015 as indicated by purlin connection arrow 1025. In one implementation, the first purlin 1015 and second purlin 1020 can be connected via a purlin coupler (e.g., see FIG. 16, purlin coupler 1605).

In one implementation, the first row of photovoltaic modules 1005 and corresponding purlin 1015 can span two crossbeams 1030, and subsequent rows of photovoltaic modules and corresponding purlins (e.g., the second row of photovoltaic modules 1010 and corresponding purlin 1020) span one or more crossbeams 1030. As a result, the one or more rows of photovoltaic modules, corresponding purlins, and crossbeams form one or more canopies of a solar power generation assembly. Alternatively, or additionally, the one or more purlins and photovoltaic modules 1005 can be pre-assembled and lifted as an assembly, as one of ordinary skill would recognize.

Figure 11B:
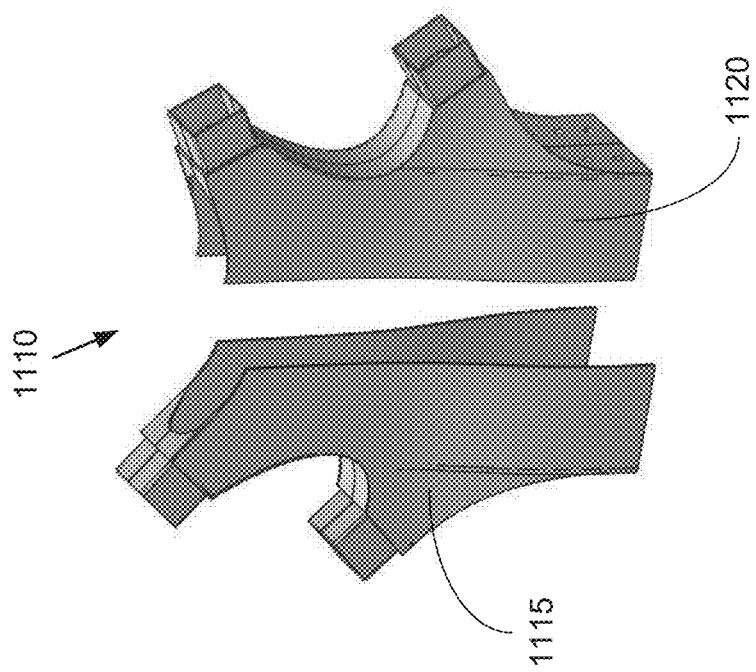
FIG. 11B depicts an exemplary casting according to one or more aspects of the disclosed subject matter.
Figure 11A:
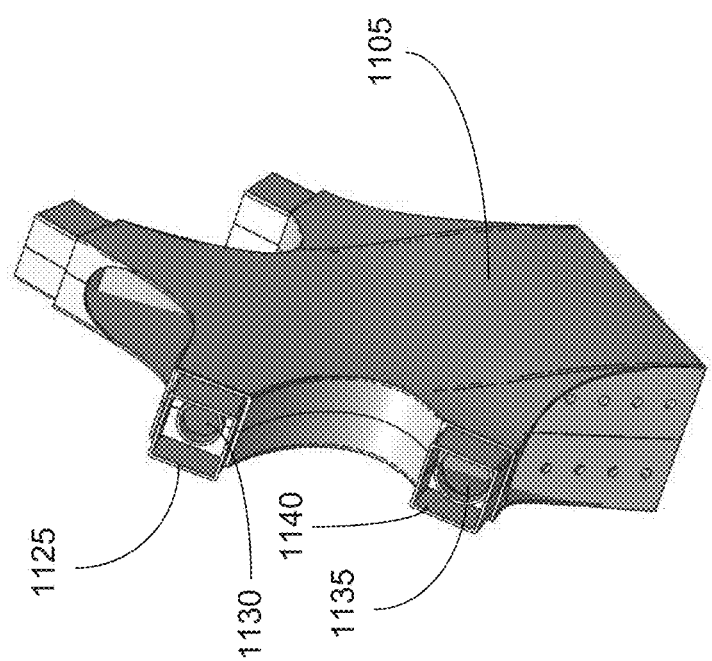
FIG. 11A depicts an exemplary casting according to one or more aspects of the disclosed subject matter.

FIG. 11A depicts an exemplary casting 1105 according to one or more aspects of the disclosed subject matter. In one implementation, the casting 1105 is a one piece casting. The casting 1105 can include a first receiving portion 1125 and a second receiving portion 1140 for the braces on each side of the support structure. In one implementation, the receiving portions 1125, 1140 is square to receive square braces. However, other shapes and/or form factors are possible.

Additionally, the casting 1105 can be manufactured such that each receiving portion 1125 is at a predetermined angle regardless of the type of solar power generation assembly 100, 200, or 300. As a result, the same casting 1105 can be used for each type of solar power generation assembly 100, 200, 300, and for any tilt angle of any canopy or portion of the canopy. Instead of adjusting the angles of the receiving portions 1125 of the casting 1105, the lengths of the braces are adjusted to accommodate corresponding tilt angles. Because the same casting 1105 can be used for each type of solar power generation assembly 100, 200, 300, manufacturing costs can be significantly reduced and installation efficiency can be improved, for example.

In one implementation, the receiving portion 1125 includes a first hole 1130 and the receiving portion 1140 includes a second hole 1135. The hole 1130 and the hole 1135 can be mirrored on the opposite side of the casting 1105. The first hole 1130 can be configured for electrical cable management such that electrical cables running through the brace that connects to the corresponding receiving portion 1125 enter the casting 1105 through hole 1130. The second hole 1135 can be configured for precipitation management such that precipitation running through the brace connected to the corresponding receiving portion 1140 runs through hole 1135. The second hole 1135 can having a larger diameter than hole 1130 to accommodate for the precipitation. It should be appreciated that the first receiving portion 1125, the first hole 1130, the second receiving portion 1140, and the second hole 1135 are mirrored on an opposite side of the casting 1105 to provide the same brace connection features, as well as the option for the same electrical cable and precipitation management features.

FIG. 11B depicts an exemplary casting 1110 according to one or more aspects of the disclosed subject matter. In one implementation, the casting 1110 is a two piece casting including a first casting piece 1115 and a second casting piece 1120. It should be appreciated that the receiving portions, as well as the electrical cable and precipitation management features described in FIG. 11A also apply to the casting 1110 depicted in FIG. 11B. Any desirable number of pieces or components can be assembled to form a casting.

Figure 12A:
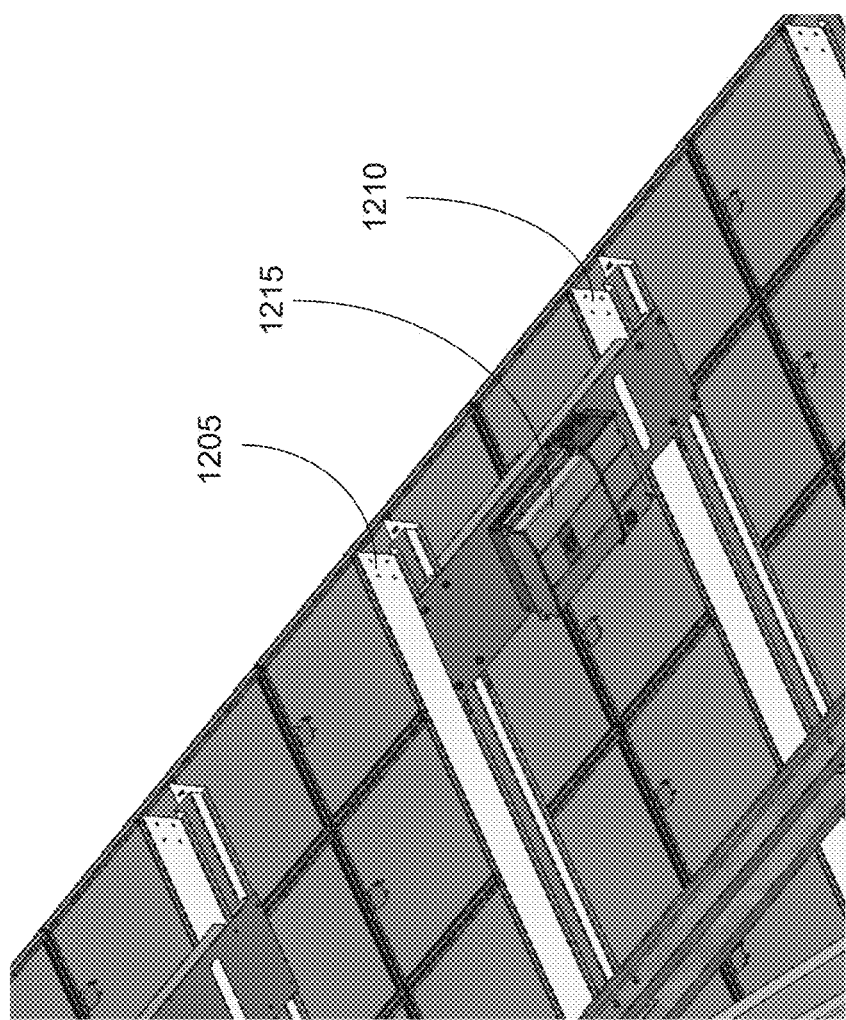
FIG. 12A depicts an exemplary placement for an inverter according to one or more aspects of the disclosed subject matter.

FIG. 12A depicts an exemplary placement for an electrical component or accessory (e.g. inverter) 1215 according to one or more aspects of the disclosed subject matter. In one implementation, the inverter 1215 spans between a first purlin 1205 and a second purlin 1210.

Figure 12B:
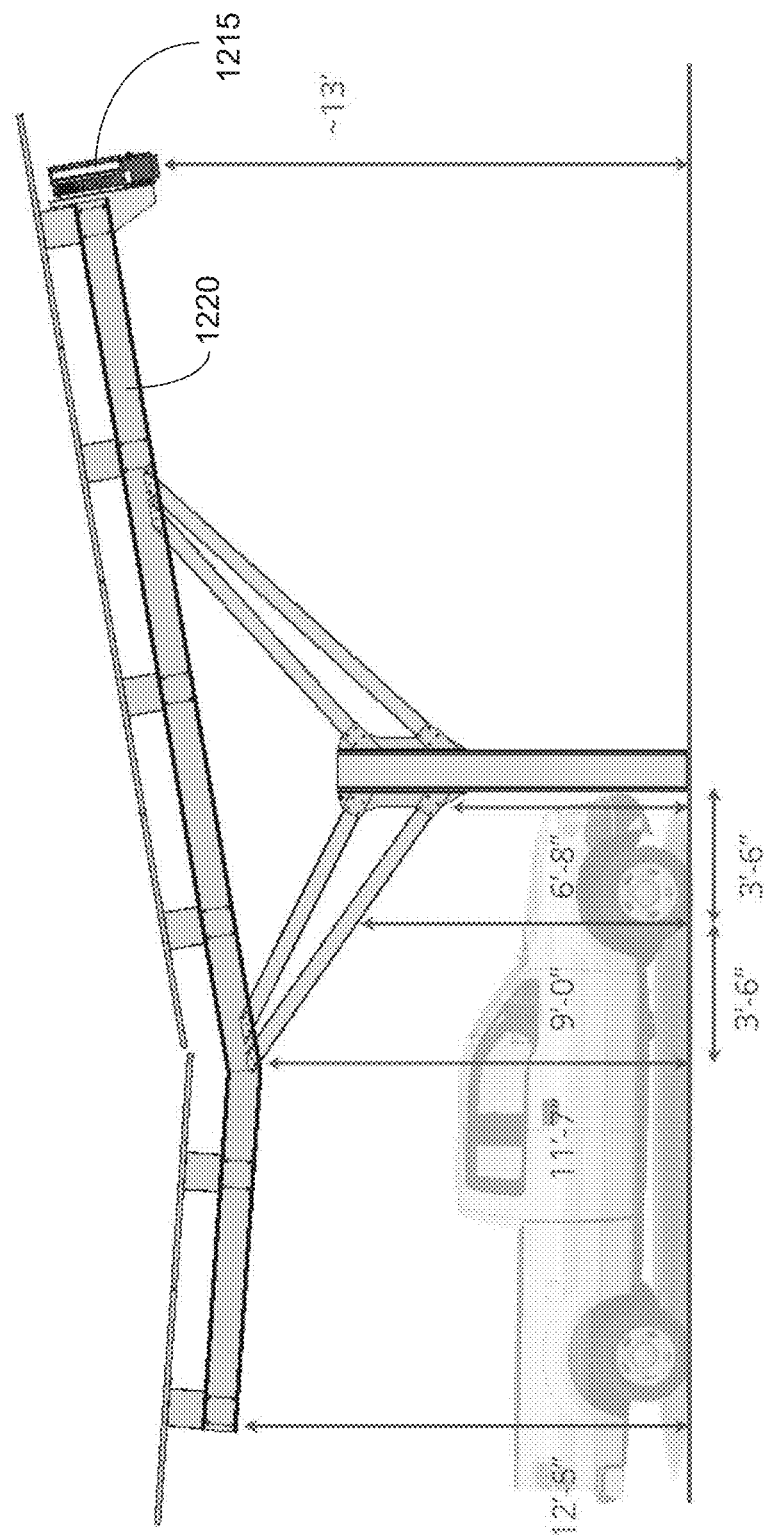
FIG. 12B depicts an exemplary placement for an inverter according to one or more aspects of the disclosed subject matter.

FIG. 12B depicts an exemplary placement for the inverter 1215 according to one or more aspects of the disclosed subject matter. In one implementation, the inverter 1215 is positioned at an end of a crossbeam 1220. Additionally, it should be appreciated that the distance measurements indicated in FIG. 12B are exemplary and can change based on column height, tilt angle, and the like.

In one implementation, the inverter 1215 is configured to invert direct current from the photovoltaic modules to alternate current for the one or more integrated charging station 815, for example. Additionally, it should be appreciated that different numbers and/or sizes of inverters can be used based on the size of the solar power generation assembly.

Figure 13B:
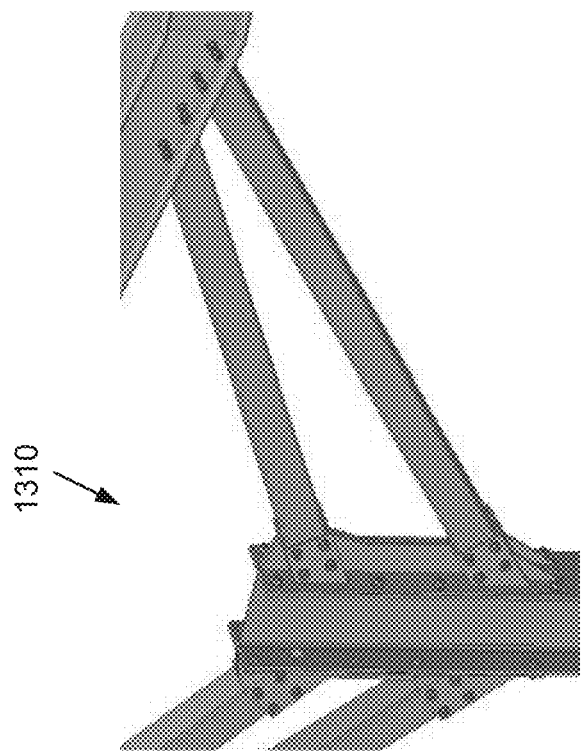
FIG. 13B depicts an exemplary column-to-brace casting according to one or more aspects of the disclosed subject matter.
Figure 13A:
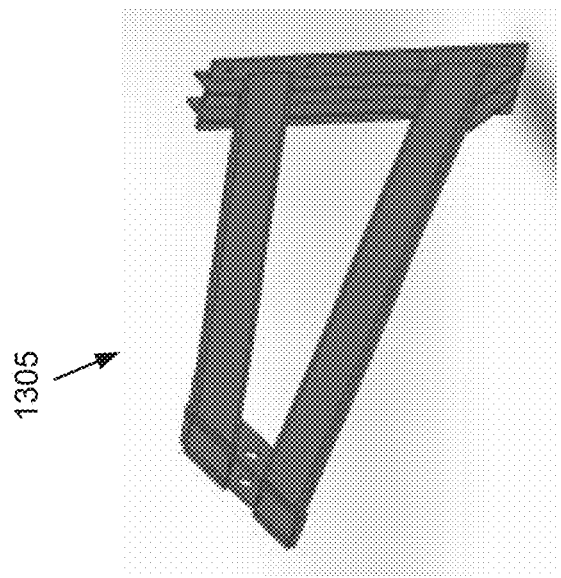
FIG. 13A depicts an exemplar) column-to-brace weldment according to one or more aspects of the disclosed subject matter.

FIG. 13A depicts an exemplary column-to-brace weldment 1305 according to one or more aspects of the disclosed subject matter. In one implementation, the braces on each side of a column are welded to a portion of the column-to-brace weldment 1305 that is then attached to the column. The column-to-brace weldment 1305 can reduce a number of parts (e.g., fasteners) required to secure the braces to the column.

FIG. 13B depicts an exemplary column-to-brace casting 1310 according to one or more aspects of the disclosed subject matter. In one implementation, the braces on each side of a column are attached to a casting via fasters in the column-to-brace casting 1310 configuration. The column-to-brace casting 1310 reduces fabrication cost because there is no welding, there is optimization of material for casting, it maximizes shipping volume, and the like. Additionally, more bolting points allows for tolerance adjustments.

Regarding FIG. 13A and FIG. 13B, it should be appreciated that all aspects of precipitation and electrical cable management apply to both the column-to-brace weldment 1305 and the column-to-brace casting 1310. Unless specifically stated, any reference herein referring to "casting" or "casting structure" may be or include the column-to-brace weldment 1305 or the column-to-brace casting 1310.

FIG. 14A depicts a perspective view of a crossbeam 1410 according to one or more aspects of the disclosed subject matter. Additionally, arrow 1405 depicts a lengthwise end view of the crossbeam as shown in FIG. 14B.

FIG. 14B depicts a lengthwise end view of the crossbeam 1410 along from the perspective of the arrow 1405 in FIG. 14A according to one or more aspects of the disclosed subject matter. The lengthwise end view of the crossbeam 1410 depicts space available for electrical cable and precipitation management.

FIG. 15A depicts an exemplary connection of a crossbeam 1505 connected to a purlin 1510 according to one or more aspects of the disclosed subject matter. In one implementation, the crossbeam 1505 is connected to the purlin 1510 via a connection apparatus 1515.

FIG. 15B depicts the connection apparatus 1515 configured to attach the crossbeam 1505 to the purlin 1510 according to one or more aspects of the disclosed subject matter. In one implementation, the connection apparatus 1515 is configured to connect the crossbeam 1505 to the purlin 1510 while leaving the crossbeam 1505 open for electrical cable and precipitation management.

FIG. 16A depicts an exemplar) row of photovoltaic modules including a purlin coupler 1605 and an end cap 1630 according to one or more aspects of the disclosed subject matter. In one implementation, the purlin coupler 1605 connects two purlins together. Additionally, the purlin end cap 1630 is a cap secured to an end of the purlin. In one implementation, the purlin end cap 1630 is an aesthetic component to improve the aesthetic look of the end of the purlin. Additionally, the purlin end cap 1650 can prevent precipitation from flowing out the end of the purlin, thereby further assisting the precipitation flow (e.g., precipitation flow 1605) toward the braces of the support structure to assist in removing precipitation from the one or more canopies of the solar power generation assembly. Further, the purlin end cap 1630 is a structural component that joins each side of the purlin together, thus increasing the strength of the purlin.

FIG. 16B depicts the purlin coupler 1605 according to one or more aspects of the disclosed subject matter. In one implementation, the purlin coupler 1605 includes a forged washer block 1610 which can be secured to the purlin coupler 1605 by hardware 1625 and nut 1620 to increasing bearing area. Additionally, the purlin coupler 1605 can include one or more rivet holes 1615.

FIG. 16C depicts the purlin end cap 1630 according to one or more aspects of the disclosed subject matter. The purlin end cap 1630 can be secured to the purlin via hardware (e.g., hardware 1625 and nut 1620).

FIG. 16D depicts an end view of the purlin coupler 1605 according to one or more aspects of the disclosed subject matter. Additionally, the end view of the purlin coupler 1605 depicts how the forged washer block is secured to the purlin coupler 1605 via the hardware 1625 and nut 1620.

FIG. 16E depicts a perspective view of the forged washer block 1610 according to one or more aspects of the disclosed subject matter.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A solar power generation assembly, comprising:
   a vertical support column;
   a canopy including a plurality of solar modules configured for solar power generation;
   a first brace and a second brace on a first side of the support column and configured to support the canopy;
   a third brace and a fourth brace on a second side of the support column and configured to support the canopy; and
   a gutter system integrated into the canopy and directing precipitation along one or more of the second brace and the fourth brace to the support column,
   wherein one or more of the first brace and the third brace are configured to manage electrical cables extending from the canopy to the support column.

2. The solar power generation assembly of claim 1, wherein the canopy supported by the first brace, the second brace, the third brace and the fourth brace is a single tilt canopy, wherein the single tilt canopy is tilted at a single predetermined tilt angle.

3. The solar power generation assembly of claim 1, wherein the canopy supported by the first brace, the second brace, the third brace and the fourth brace is a symmetric dual-tilt canopy, wherein a first portion of the symmetric dual-tilt canopy is the same length as a second portion of the symmetric dual-tilt canopy.

4. The solar power generation assembly of claim 1, wherein the canopy supported by the first brace, the second brace, the third brace and the fourth brace is an asymmetric canopy, wherein a first portion of the asymmetric canopy is longer than a second portion of the asymmetric canopy.

5. The solar power generation assembly of claim 4, wherein the first portion of the asymmetric canopy is tilted to a first predetermined angle, wherein lengths of the first brace and the second brace correspond to the first predetermined angle; and
   wherein the second portion of the asymmetric canopy is tilted to a second predetermined angle, and wherein lengths of the third brace and the fourth brace correspond to the second predetermined angle.

6. The solar power generation assembly of claim 5, wherein the first and second predetermined angles are different.

7. The solar power generation assembly of claim 1, wherein a first portion of the canopy is tilted at a first predetermined tilt angle and includes a first predetermined number of rows of photovoltaic modules and a second portion of the canopy is tilted at a second predetermined tilt angle and includes a second predetermined number of rows of photovoltaic modules.

8. The solar power generation assembly of claim 1, wherein the canopy includes a plurality of purlins, each purlin being configured to support a row of photovoltaic modules, a crossbeam being positioned perpendicular to each purlin and disposed between the first brace, the second brace, the third brace, and the fourth brace and the plurality of purlins.

9. The solar power generation assembly of claim 8, wherein the purlins are configured to include integrated lighting.

10. The solar power generation assembly of claim 1, wherein the electrical cables are configured to provide alternate current to an electric vehicle charging station integrated in the solar power generation assembly.

11. The solar power generation assembly of claim 1, wherein the canopy includes a first portion supported by the first brace and the second brace and a second portion supported by the third brace and the fourth brace, the first portion and the second portion of the canopy not being directly connected.

12. A solar power generation assembly, comprising:
   a support column;
   a canopy having first and second canopy portions, the first canopy portion including a first set of solar modules configured for solar power generation and the second canopy portion including a second set of solar modules configured for solar power generation;
   a plurality of braces arranged on a first side and a second side of the support column, the plurality of braces being configured to support the first and second canopy portions; and
   a gutter system integrated into the canopy and directing precipitation from the canopy along at least one of the plurality of braces,
   wherein at least one of the plurality of braces are configured to manage electrical cables extending from the canopy to the support column.

13. The solar power generation assembly of claim 12, wherein the first portion of the canopy is longer than the second portion of the canopy; and wherein the first set of solar modules supported by the first canopy portion includes a greater number of solar modules than the second set of solar modules supported by the second canopy portion.

14. The support structure of claim 12, wherein the first portion of the canopy is tilted to a first predetermined angle, wherein lengths of each of the plurality of braces on the first side of the support column correspond to the first predetermined angle;
   wherein the second portion of the canopy is tilted to a second predetermined angle, and wherein lengths of each of the plurality of braces on the second side of the support column correspond to the second predetermined angle.

15. The solar power generation assembly of claim 14, wherein the first predetermined angle is greater than the second predetermined angle.

16. The support structure of claim 15, wherein the first predetermined angle is between 2-4 degrees and the second predetermined angle is between 10-15 degrees.

17. The support structure of claim 12, wherein the first portion of the canopy is the same length as the second portion of the canopy.

18. A dual-tilt solar generation assembly, comprising:
   a support column;
   a plurality of braces on a first side of the support column configured to support a first portion of a canopy;
   a plurality of braces on a second side of the support column configured to support a second portion of the canopy; and
   a gutter system integrated into the canopy and directing precipitation along one or more of the plurality of braces to the support column,
   wherein one or more of the plurality of braces are configured to manage electrical cables extending from the canopy to the support column,
   wherein the first portion of the canopy is longer than the second portion of the canopy, and
   wherein the first canopy portion includes a greater number of solar modules than the second canopy portion.

19. The dual-tilt solar generation assembly of claim 18, wherein the first portion of the canopy is tilted at a first predetermined tilt angle and the second portion of the canopy is tilted at a second predetermined tilt angle, and wherein the first predetermined angle is greater than the second predetermined angle.

20. The solar power generation assembly of claim 18, wherein the canopy includes a plurality of purlins, each purlin being configured to support a row of solar modules, a crossbeam being positioned perpendicular to each purlin and disposed between the plurality of braces and the plurality of purlins.

* * * * *

UNITED STATES PATENT AND TRADEMARK OFFICE
CERTIFICATE OF CORRECTION

PATENT NO. : 10,533,337 B2
APPLICATION NO. : 16/529375
DATED : January 14, 2020
INVENTOR(S) : Nicholas J. McKibben et al.

Page 1 of 1

It is certified that error appears in the above-identified patent and that said Letters Patent is hereby corrected as shown below:

On the Title Page

Item (63), the related U.S. Application Data is incorrect. Item (63) should read:
-- (63) Continuation of application No. 15/936,021, filed on Mar. 26, 2018, now Pat. No. 10,428,547, which is a continuation of application No. 29/639,281, filed on Mar. 5, 2018, now Pat. No. Des. 850,363. --

Signed and Sealed this
Third Day of March, 2020

Andrei Iancu
*Director of the United States Patent and Trademark Office*